US008416951B2

(12) United States Patent
Billet et al.

(10) Patent No.: US 8,416,951 B2
(45) Date of Patent: Apr. 9, 2013

(54) METHOD AND A DEVICE FOR GENERATING A PSEUDORANDOM STRING

(75) Inventors: Olivier Billet, Tourrettes sur Loup (FR); Henri Gilbert, Bures sur Yvette (FR); Côme Berbain, Montrouge (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 12/296,687

(22) PCT Filed: Apr. 2, 2007

(86) PCT No.: PCT/FR2007/051052
§ 371 (c)(1),
(2), (4) Date: Jan. 28, 2009

(87) PCT Pub. No.: WO2007/116171
PCT Pub. Date: Oct. 18, 2007

(65) Prior Publication Data
US 2009/0279693 A1    Nov. 12, 2009

(30) Foreign Application Priority Data
Apr. 10, 2006    (FR) ...................................... 06 51292

(51) Int. Cl.
*H04L 9/00*    (2006.01)

(52) U.S. Cl.
USPC ............................. 380/46; 713/168; 713/174

(58) Field of Classification Search .................... 380/46; 713/168, 174
See application file for complete search history.

(56) References Cited

U.S. PATENT DOCUMENTS

| 4,745,568 | A | * | 5/1988 | Onyszchuk et al. | 708/492 |
|---|---|---|---|---|---|
| 5,365,585 | A | * | 11/1994 | Puhl et al. | 380/265 |
| RE36,181 | E | * | 4/1999 | Koopman, Jr. et al. | 713/168 |
| 7,389,316 | B1 | * | 6/2008 | Baetoniu | 708/250 |
| 7,945,784 | B1 | * | 5/2011 | Masinter et al. | 713/180 |
| 2001/0056452 | A1 | * | 12/2001 | Kaliski et al. | 708/492 |
| 2003/0194087 | A1 | * | 10/2003 | Jansen et al. | 380/265 |
| 2003/0208518 | A1 | * | 11/2003 | Gura et al. | 708/492 |
| 2006/0010430 | A1 | * | 1/2006 | Cousot et al. | 717/127 |
| 2006/0190518 | A1 | * | 8/2006 | Ekner et al. | 708/523 |
| 2006/0239459 | A1 | * | 10/2006 | Yamamichi et al. | 380/255 |
| 2007/0291937 | A1 | * | 12/2007 | Katagi et al. | 380/30 |
| 2009/0136022 | A1 | * | 5/2009 | Langendoerfer et al. | 380/28 |

OTHER PUBLICATIONS

Knuth, "Generating Uniform Random Numbers," Seminumerical Algorithms. Photocopied Replacement of Missing Original, Art of Computer Programming, Reading, Addison Wesley, US, vol. 2, pp. 9-37 (1980).
L'Ecuyer, "A Tutorial on Uniform Variate Generation," Proceedings of the 1989 Winter Simulation Conference, pp. 40-49 (Dec. 4, 1989).

(Continued)

*Primary Examiner* — Jeffrey Pwu
*Assistant Examiner* — Jayesh Jhaveri
(74) *Attorney, Agent, or Firm* — Drinker Biddle & Reath LLP

(57) ABSTRACT

The invention relates to a method of generating a pseudorandom string of terms belonging to a finite body K of cardinal $q \geq 2$ intended to be used in a cryptography procedure, said method comprising the iterative calculation of a system ($\Gamma$) of m polynomials with n variables belonging to the finite body K. According to the invention, the coefficients of these m polynomials are regenerated at each iteration. The invention also relates to pseudorandom string generator intended to implement this method.

14 Claims, 2 Drawing Sheets

OTHER PUBLICATIONS

Matsumoto et al., "Public Quadratic Polynomial-Tuples for Efficient Signature-Verification and Message-Encryption," Advances in Cryptology—Eurocrypt. International Conference on the Theory and Application of Cryptographic Techniques, Springer Verlag, DE, Chapter I, pp. 419-453 (May 25, 1988).

* cited by examiner

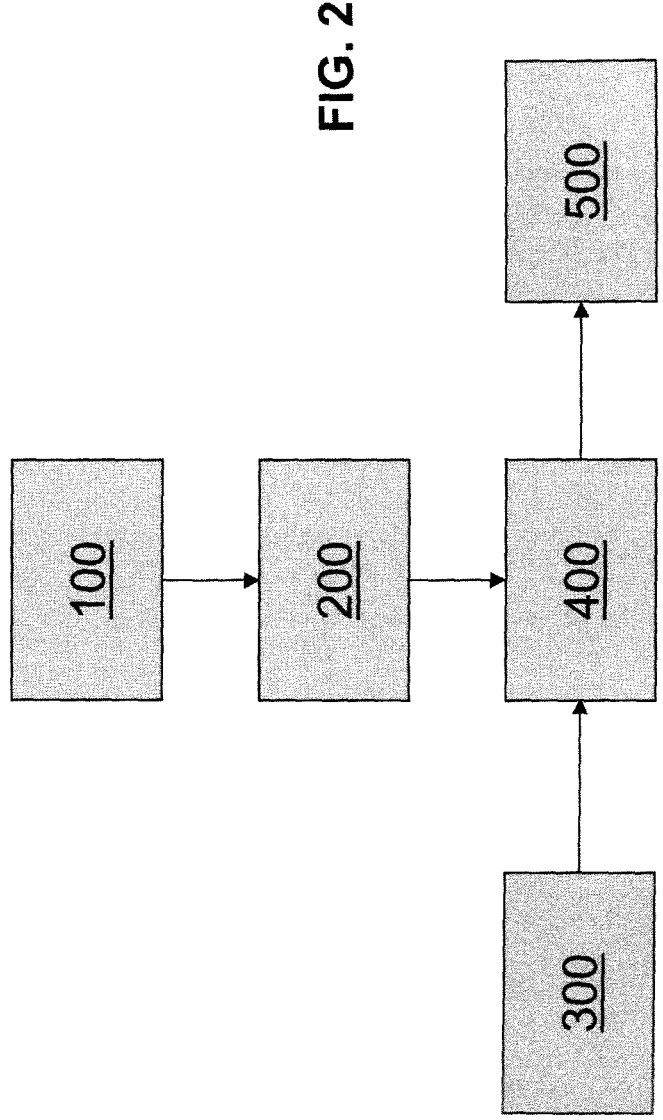

000
METHOD AND A DEVICE FOR GENERATING A PSEUDORANDOM STRING

CROSS-REFERENCE TO RELATED APPLICATIONS

This application is the U.S. national phase of the International Patent Application No. PCT/FR2007/051052 filed Apr. 2, 2007, which claims the benefit of French Application No. 06 51292 filed Apr. 10, 2006, the entire content of which is incorporated herein by reference.

FIELD OF THE INVENTION

The present invention relates to producing pseudorandom strings of symbols belonging to a given alphabet. Such strings are used in particular in some cryptography procedures.

BACKGROUND OF THE INVENTION

A pseudorandom string is one that, although produced deterministically, is impossible to distinguish, at least in a reasonable time, from a string of symbols in which each symbol is chosen entirely at random from the alphabet (the meaning of reasonable time is obviously linked to the target application and to the available computation power). In practice, a pseudorandom string is usually produced by initializing an appropriate algorithm using a secret parameter (called the seed or key, depending on the context), and where appropriate an additional parameter, secret or not, called the initialization vector.

The alphabet referred to above can be the binary set $\{0,1\}$, the set of digits from 0 to 9 or the alphanumeric set comprising those digits and the uppercase and lowercase letters. In the context of the present invention, the symbols of the alphabet belong to a finite body K or Galois body GF(q) of cardinal $q \geq 2$.

An important application of pseudorandom strings is stream encryption. This technique is used to encrypt (in the cryptographic sense) a string of data in clear $\{x_i\}$ (indexed by i) with values in the alphabet by means of another string $\{z_i\}$ of values in the same alphabet, where $\{z_i\}$ is a string produced by a pseudorandom generator, to produce an encrypted string $\{y_i\}$, also with values in the alphabet. In other words, a law of internal composition $y_i = x_i * z_i$ within the alphabet is chosen; for example, this internal law can be the exclusive OR operator if the alphabet is the binary alphabet $\{0,1\}$. Stream encryption is also known as on the fly encryption because data words are encrypted one by one, as opposed to encryption methods operating on blocks of data. Compared to block encryption, stream encryption has the advantage of reducing transmission delay and data storage problems, but obviously requires a pseudorandom symbol data rate at least as high as the data rate of the data in clear; the application to stream encryption is therefore reserved to relatively fast pseudorandom string generators.

Stream encryption is used in the TLS (Transport Layer Security) Internet exchange protection protocol (see "The TLS Protocol", T. Dierks and C. Allen, version 1.0, RFC 2246, January 1999), one of the most widely used stream encryption algorithms of which is the RC4 algorithm (see "Linear Statistical Weakness of Alleged RC4 Keystream Generator", J. D. Golic, proceedings of "Advances in Cryptology—EUROCRYPT '97", pages 226 to 238, editor W. Fumy, Lecture Notes in Computer Science vol. 1233, Springer-Verlag), and in radio channel traffic and signaling encryption in the GSM system using algorithms of which the most widely used is the A5/1 algorithm (see "Real Time Cryptanalysis of A5/1 on a PC", A. Biryukov, A. Shamir, and D. Wagner, Proceedings of FSE 2000, pages 1 to 18, editor B. Schneier, Springer-Verlag 2000).

There are other important applications of pseudorandom strings, for example stochastic calculations and public key authentication cryptography protocols.

Many current stream algorithms, for example the A5/1 algorithm referred to above, use recurrent linear strings produced by linear feedback registers, possibly combined using non-linear functions (see "Le chiffrement à la volée" ["On the fly encryption"], A. Canteaut, special issue of the review "Pour la Science", pages 86 and 87, Paris, July-October 2002). Those algorithms can be implemented in fast pseudorandom string generators but caution is called for with regard to their security, as they lack strong security arguments on which great confidence can be placed, concerning the impossibility in practice of distinguishing the pseudorandom strings produced from totally random strings.

French patent application 05 06041 discloses a generator of pseudorandom strings of terms belonging to a finite body K of cardinal $q \geq 2$ intended to be used in a cryptography procedure. This generator includes means for calculating iteratively, from an initialization n-tuple $X^{(0)} = (X^{(0)}_1, X^{(0)}_2, \ldots, X^{(0)}_n)$ of elements of K, n-tuples $X^{(i)} = (X^{(i)}_1, X^{(i)}_2, \ldots, X^{(i)}_n)$ of elements of K (where $i=1, 2, \ldots$), each n-tuple $X^{(i)}$ resulting in a predetermined manner from an m-tuple $Y^{(i)} = (Y^{(i)}_1, Y^{(i)}_2, \ldots, Y^{(i)}_m)$ of elements of K and the terms of said pseudorandom string being extracted in a predetermined way from the n-tuples $X^{(i)}$ and/or the m-tuples $Y^{(i)}$. This generator is noteworthy in that it further includes means for obtaining, for one or more values of i, one or more components $Y^{(i)}_k$ (where $k=1, 2, \ldots, m$) of the m-tuple $Y^{(i)}$ by applying to the components of the n-tuple $X^{(i-1)}$ a predetermined quadratic form with coefficients in K.

This pseudorandom generator uses an algorithm offering a high level of security, given the difficulty of the problem of solving a system of quadratic equations over a finite body. Subject to verification of the commonly accepted conjecture $P \neq NP$ of complexity theory, it can be shown that, whatever the finite body K considered, solving this problem requires more than polynomial time, even if verifying whether a given candidate is or is not a solution of this system of equations can be effected in polynomial time (this kind of problem is called an NP-hard problem). Moreover, even for relatively modest sizes of m and n (for example for K=GF(2) and m and n greater than or equal to 100), if the values of m and n are sufficiently close, no efficacious method of solving random instances of this problem is known at present.

This being so, the question arises of determining whether a pseudorandom generator according to French patent application 05 06041 can be sufficiently effective, i.e. require computation resources (time, memory, etc.) for each symbol of the string produced that are sufficiently small (at least for moderate parameter values, but nevertheless sufficiently high for the problem just mentioned still to be considered difficult) for use of this kind of generator on the industrial scale to be envisaged.

This question of required calculation resources relates in particular to the possibility of integrating a pseudorandom generator of this type into low-cost electronic systems such as hardwired logic chips. Hardwired electronic logic circuits are made up of logic gates produced from transistors (it is possible to conceive of all the logic functions of a program using logic gates of two types, NAND gates and NOR gates). The number of logic gates required to implement a logic circuit therefore reflects in particular the size of the circuit, its current consumption, and its cost.

Consider therefore in more detail the calculations carried out in the pseudorandom generator of French patent application 05 06041.

The generator calls iteratively one or more quadratic form(s) associating, on iteration i, at least one variable $Y^{(i)}_k$ (where k=1, 2, . . . , m) with n variables $X^{(i-1)}_j$ (where j=1, 2, . . . , n). This association therefore consists in a particular function "G", which associates with an n-tuple $X=(x_1, x_2, \ldots, x_n)$ of input values the m-tuple $Y=(y_1, y_2, \ldots, y_m)$ of output values. This function G therefore corresponds to a system (G) of m multivariate quadratic polynomials (i.e. with n variables $x_1$ to $x_n$, where n>1) over a finite body K. These polynomials are therefore of the following form, in which the coefficients belong to K and the quantities $y_k$ also belong to K:

$$\sum_{1 \leq i \leq j \leq n} \alpha_k^{(ij)} x_i x_j + \sum_{1 \leq j \leq n} \beta_k^{(j)} x_j + \gamma_k = y_k (1 \leq k \leq m)$$

In the conventional way to implement this kind of generator, the values of these coefficients would be stored in a memory and the values of the m polynomials would be calculated on each iteration. It would therefore be necessary to store a total number of coefficients equal to m·N, where N is the number of terms of each polynomial. It is a simple matter to verify that, for a quadratic polynomial with n variables, this number N of terms is equal to $$N = 1 + \frac{n(n+1)}{2}.$$

Moreover, for solving a system of m quadratic equations in n unknowns over K to be considered difficult, it is desirable for the values of m and n to be sufficiently large and for their orders of magnitude to be sufficiently close. Thus for high values of n, and for values of m of the same order of magnitude as the values of n, the number of coefficients to be stored is of the order of $n^3$. For example, if n is approximately equal to 100, approximately one million coefficients must be stored.

As a result, conventional implementation of a pseudorandom generator according to French patent application 05 06041 requires far too many electronic gates for it to be possible to envisage incorporating it into a hardwired logic chip. It goes without saying that it is even less feasible to envisage inserting into a hardwired logic chip a pseudorandom generator using a system of multivariate polynomials some of which have a global degree higher than 2, although polynomials of higher degree would have the advantage of making the generator more secure, at the cost of a modest increase in calculation resources.

SUMMARY OF THE INVENTION

The present invention therefore relates to a generator of a pseudorandom string of terms belonging to a finite body K of cardinal q≧2 intended to be used in a cryptography procedure, said generator including means for iteratively calculating a system (Γ) of m polynomials with n variables belonging to a finite body K. This pseudorandom string generator is noteworthy in that the coefficients of said m polynomials are regenerated on each iteration.

Thus the invention generates (for example recalculates) the coefficients of the polynomials on each iteration based on a small number of parameters, so that the memory size required for the generator of the invention to function is very modest.

The inventors have realized that, in contrast to what might naively be expected, the additional calculation load that the invention entails has very little impact on the overall calculation time. Since the calculation time for polynomials of relatively high degree is relatively short, even if there are many of them and they are functions of numerous variables, as is well known, the invention produces a pseudorandom generator that is both fast (and therefore can be used for stream encryption, for example) and very suitable for low-cost calculation devices, these advantages being additional to the increased security referred to above.

If high speed is the prime requirement, each of said polynomials forming the system is advantageously of second degree at most.

According to particular features, the pseudorandom string generator includes a coefficient generator module in the form of a linear shift register.

Alternatively, the coefficient generator module can take the form of a nonlinear shift register or a finite state machine.

By means of these features, a large number of coefficients can be generated using a small electronic memory.

According to particular features, to calculate the m-tuple of values $(y_1, y_2, \ldots, y_m)$ taken, for a given n-tuple of variables $(x_1, x_2, \ldots, x_n)$, by the m polynomials of a system (Γ) in which the polynomials are all of global degree less than or equal to D, the generator includes means for:

choosing a processing order for a given set of terms of the general polynomial with n variables of degree D;

for the processed terms, calculating, in the same order, the mononomial for the variables and then, successively for the m polynomials, generating the coefficient of that term and multiplying that coefficient by said mononomial to obtain the value of said term.

By means of these features, each factor for the variables is calculated only once rather than m times.

In a correlated way, the invention relates to a method of generating a pseudorandom string of terms belonging to a finite body K of cardinal q≧2 intended to be used in a cryptography procedure, said method iteratively calculating a system (Γ) of m polynomials with n variables belonging to a finite body K. This method of generating a pseudorandom string is noteworthy in that the coefficients of the m polynomials are regenerated on each iteration.

According to particular features each of said polynomials is at most of second degree.

According to particular features, to calculate the m-tuple of values $(y_1, y_2, \ldots, y_m)$ taken, for a given n-tuple of variables $(x_1, x_2, \ldots, x_n)$, by the m polynomials of a system (Γ) in which the polynomials are all of global degree less than or equal to D, the method including the following steps:

choosing a processing order for a given set of terms of the general polynomial with n variables of degree D;

for the processed terms, calculating, in the same order, the mononomial for the variables and then, successively for the m polynomials, generating the coefficient of that term and multiplying that coefficient by said mononomial to obtain the value of said term.

The advantages of these methods are essentially the same as those of the correlated pseudorandom sequence generators briefly described above.

The invention is also directed to:
an electronic circuit, in particular a hard-wired logic chip, including any of the pseudorandom string generators briefly described above;
non-removable data storage means including computer program code instructions for executing the steps of any of the methods of generating a pseudorandom string briefly described above;
partly or totally removable data storage means containing computer program code instructions for executing the steps of any of the methods of generating a pseudorandom string briefly described above; and
a computer program containing instructions such that, when said program controls a programmable data processing device, said instructions cause said data processing device to execute any of the methods of generating a pseudorandom string briefly described above.

The advantages of this electronic circuit, these data storage means and this computer program are essentially the same as those of said methods.

BRIEF DESCRIPTION OF THE DRAWINGS

Other aspects and advantages of the invention become apparent on reading the following detailed description of particular embodiments, provided by way of non-limiting example. The description refers to the accompanying drawings, in which:

FIG. 2 is a block diagram showing the pseudorandom generator of one embodiment of the invention.

DETAILED DESCRIPTION IF THE INVENTION

Figure 1:
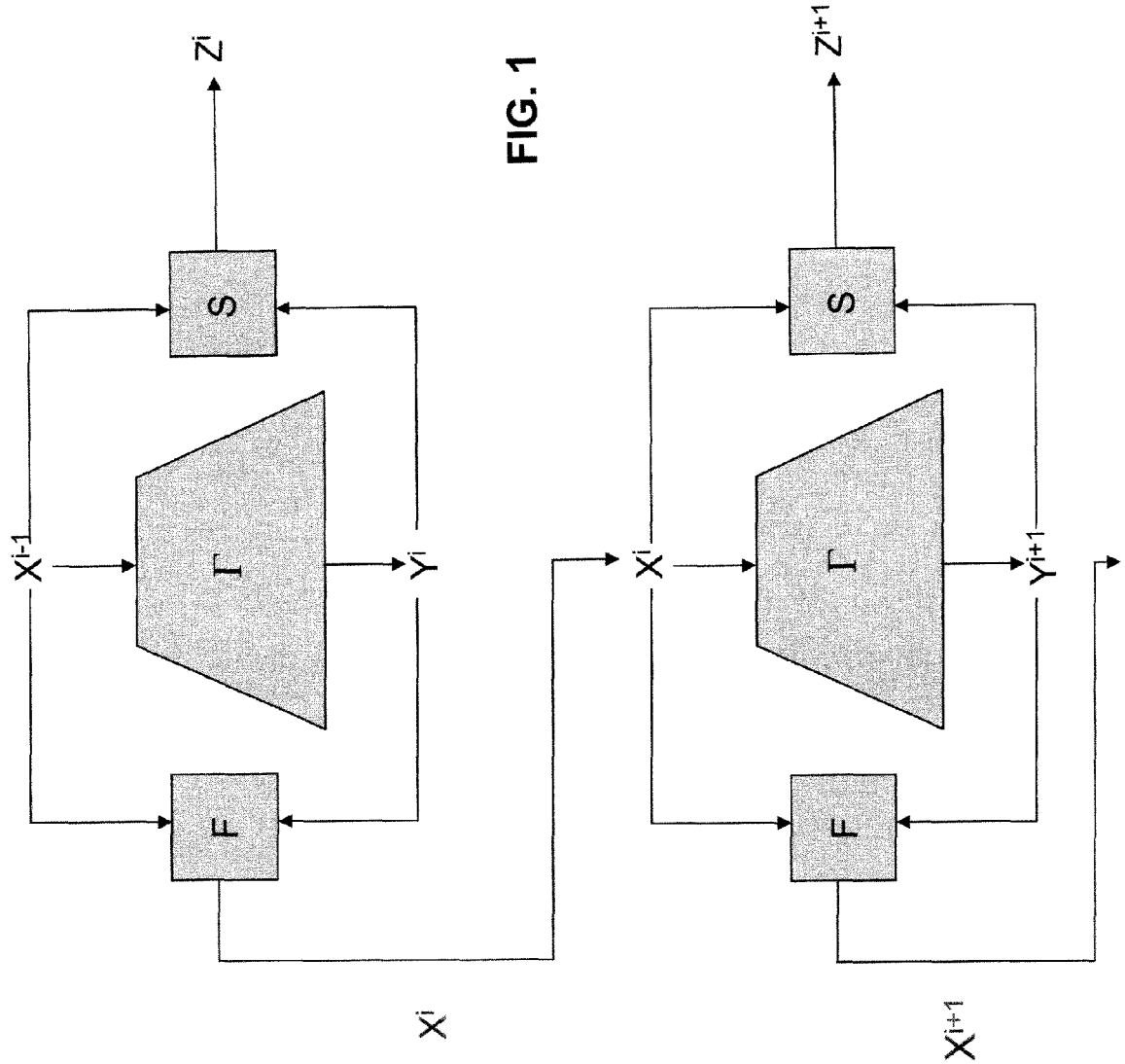
FIG. 1 is a block diagram showing the method of one embodiment of the invention for generating a pseudorandom string.

As explained above, the security of the pseudorandom string generator of the present invention (i.e. the impossibility for a "hacker" to calculate the $(i+1)^{th}$ term of the string at the output from the first i terms) is based on the difficulty of the problem of solving m equations in n unknowns over a finite body K.

In one embodiment, these equations can all be quadratic equations, as in French patent application 05 06041 (to simplify the description, the expressions "quadratic equation" and "quadratic polynomial" are used even when some equations, respectively some polynomials, are linear—it being understood that at least one equation, respectively at least one polynomial, of the system is in fact of the second degree). This problem can be precisely formulated as follows:

given a system (Γ) of m quadratic equations in n unknowns $x_1$ to $x_n$ belonging to a finite body K, of the form $$\sum_{1 \le i \le j \le n} \alpha_k^{(ij)} x_i x_j + \sum_{1 \le j \le n} \beta_k^{(j)} x_j + \gamma_k = y_k (1 \le k \le m)$$

where the coefficients $\alpha_k^{(ij)}$, $\beta k^{(j)}$ and $\gamma_k$ belong to K, and where the quantities $y_k$ also belong to K;
find a solution $X=(x_1, x_2, \ldots, x_n)$.
"Γ" is the function, described by the system of equations (Γ), that with a n-tuple $X=(x_1, x_2, \ldots, x_n)$ of input values associates the m-tuple $Y=(Y_1, Y_2, \ldots, y_n)$ of output values.

The pseudorandom generator calls iteratively one or more quadratic form(s) associating at least one variable $Y_k^{(i)}$ (where k=1, 2, ..., m) with n variables $X^{(i-1)}_j$ (where j=1, 2, ..., n). As explained above, the parameters q, m and n are preferably chosen so that:

solving a system of m quadratic equations in n unknowns over K can be considered difficult, which requires that the values of m and n are sufficiently high, and that their orders of magnitude are sufficiently close (for example $q^n$ and $q^m$ both between $2^{80}$ and $2^{400}$); and the calculations can be effected efficiently, which requires that the values of q, m and n are sufficiently small (for example q less than one hundred, with m and n less than a few hundred).

Moreover, according to the invention, the coefficients of these quadratic forms are regenerated (for example recalculated) on each iteration.

It is clear that the greater the number of zero coefficients, the faster the calculations; care must nevertheless be taken that a sufficient number of coefficients of quadratic terms (below denoted $\alpha_k^{(ij)}$) are non-zero for solving the system of equations to be impossible in practice; if, to increase execution speed, some equations (but obviously not all of them) are linear relative to all the variables, it is recommended that the method of generating the coefficients remain secret, to compensate the fact that (in theory) it is easier to solve the system of equations.

The correlative embodiment of the method of the invention for generating a pseudorandom string is shown in FIG. 1. In this embodiment, for each value of i, all components of the m-tuple $Y^{(i)}$ are calculated by applying quadratic forms with coefficients in K to the components of the n-tuple $X^{(i-1)}$.

First of all, during an initialization step, a n-tuple $X^{(0)}$ is constituted. Depending on the intended use of the generator, $X^{(0)}$ can depend on a public seed, a secret key, an initialization vector or a combination of these elements; an initialization vector is an additional parameter, generally not secret, enabling the same secret key to be used more than once to generate a number of different pseudorandom strings.

The iterative steps are then executed to produce, from the initial state $X^{(0)}$ and by the method described below, a pseudorandom string $Z^{(i)}$ (where i=1, 2, ...) consisting of t-tuples of elements of K, where t is a constant between 1 and m. The total number of iterations can be between 1 and $2^{50}$, for example.

On the $i^{th}$ iteration, a current state $X^{(i-1)}$ consisting of an n-tuple of elements of K is taken as an input value for executing the following substeps:

1) an m-tuple $Y^{(i)}$ of values of K is deducted from $X^{(i-1)}$ using the function Γ defined above, i.e. $Y^{(i)}=Γ(X^{i-1})$;

2) an output value $Z^{(i)}$ is obtained by applying to the pair $(X^{(i-1)}, Y^{(i)})$ a chosen output function S, i.e. $Z^{(i)}=S(X^{(i-1)}, Y^{(i)})$; and 3) a new current state $X^{(i)}$, consisting of a n-tuple of values of K, is obtained by applying to the pair $(X^{(i-1)}, Y^{(i)})$ a chosen feedback function F, i.e. $X^{(i)}=F(X^{(i-1)}, Y^{(i)})$.

This method is represented in a sequential manner in FIG. 1 (covering two successive iterations), but it could equally well be represented in a looped manner. The important point to note here is that the successive steps of the method can be implemented by one electronic circuit.

See French patent application 05 06041 for examples of possible choices for the feedback function F and for the output function S referred to above. Also see that application for examples of means for constituting diverse pseudorandom strings of symbols (for example binary symbols) at the output, on the basis of at least the string $Z^{(i)}$.

FIG. 2 is a diagram showing one embodiment of the pseudorandom string generator of the invention. This generator comprises the following modules:

- a memory (100) for containing the values of the input variables of the system of polynomials to be calculated;
- a memory (500) for containing, at the end of the calculation, the value taken by one or more of the polynomials to be calculated, and intended to serve simultaneously as an intermediate value storage unit;
- a module (200) for generating (in a predetermined order) values of the various mononomials involved in the system of polynomials to be calculated, the mononomial generator module (200) optionally having its own memory;
- a module (300) for generating the sequence of coefficients defining the system of polynomials to be calculated, the module (300) having its own memory; and
- a combination module (400) for multiplying coefficients and values of the mononomials to update the memory (500) containing the values of the polynomials.

One particularly advantageous embodiment of the above coefficient generator module (300) is described below.

Note that it not necessary, for correct functioning of the pseudorandom generator of the invention, to apply the same function Γ in each iteration; in other words, there is nothing to prevent the value of each coefficient of the m polynomials varying from one iteration to another, if that proves convenient. The present embodiment makes skilful use of this.

A first embodiment of the coefficient generator module (300) takes the form of a linear feedback shift register (LFSR).

A LFSR consists of a set of l memories $a_1, a_2, \ldots, a_l$ refreshed on each clock pulse by replacing the value contained in each memory $a_i$ by the value contained in the memory $a_{i+1}$, except for the value contained in the memory $a_1$, which is replaced by a given linear combination of the values contained in various memories on the preceding clock pulse.

The output bits from the linear shift registers are conventionally used as pseudorandom bit strings. According to the present invention, the LFSR output data is advantageously used, not to generate the output values $Z^{(i)}$ directly, but to generate the coefficients of m polynomials. An LFSR produces a pseudorandom string of length $(2^r-1)$ from only r bits in memory and using an electronic circuit including only of the order of r logic gates.

For example, in a system of equations (Γ) comprising m=80 multivariate polynomials with n=80 variables over the binary body GF(2), the m·N≈259200 coefficients of the system can be generated from a linear shift register with r=18 bits rather than the 259200 bits of a naïve implementation.

In a second embodiment, the coefficient generator module (300) takes the form of a non-linear feedback shift register (NLFSR). Compared to a linear feedback shift register, this involves a very slight additional cost in terms of the number of electronic gates, but significantly improves the random nature of the string of terms produced at the output of the generator.

In a third embodiment, the coefficient generator module (300) takes the form of a finite state machine comprising:
- a memory updated on each clock pulse;
- a circuit for updating the memory; and
- an expansion circuit for expanding the data stored in the memory.

The expression "expansion circuit" refers to a circuit adapted to generate f bits from g bits in memory, where f>g. For example, if f is a multiple of h, the set of f bits can be divided into subsets each of h bits, after which each of these subsets of h bits is passed through a string of mixers, and the resulting strings of bits are finally concatenated.

In a finite state machine all memory values (before expansion) are refreshed on each clock pulse, whereas in a shift register only one value in memory is refreshed on each clock pulse. A finite state machine therefore performs faster calculations than a shift register, but at the cost of a certain increase in the number of electronic gates.

The above embodiments nevertheless generate on each iteration the coefficients of the system of equations (Γ) quickly and using a small number of electronic gates.

Different embodiments of the mononomial value generator module (200) can also be envisaged. To simplify the description, only the calculation of quadratic terms (of the type $x_i x_j$, where i and j vary from 1 to n) are considered here.

The "naïve" implementation considers all pairs of variables one after the other; the calculation therefore requires $n^2$ clock pulses.

However, the mononomials can instead be calculated as follows: two copies of the current string of values of the variables $(x_1, x_2, \ldots, x_n)$ are placed in memory.

Calculating the "facing" terms first produces n squares $x_i^2$. Circular permutation by one position is then applied to one of the strings of values of the variables $(x_1, x_2, \ldots x_n)$; calculating the "facing" terms again produces n products $x_1 x_2$, $x_2 x_3, \ldots, x_n x_1$. This process of calculating the mononomials n by n is continued until $n^2$ products are obtained. In the end, multiplication being commutative, only n/2 clock pulses are required, but this device requires twice as much memory as the "naïve" implementation.

Finally, speed can be increased and memory capacity economized by combining generation of the coefficients in the module (300) with generation of the mononomials in the module (200), to calculate each term of the same type for all the polynomials "in parallel", before passing on to the next term. For example, in a system of quadratic polynomials, the corresponding mononomial for the corresponding variables (respectively of type $x_i x_j$, $x_j$, or 1) is calculated, after which, for the m polynomials in succession, the coefficient of this term (respectively of type $\alpha_k^{(ij)}$, $\beta_k^{(j)}$ or $\gamma_k$) is generated and then multiplied by said mononomial to obtain the value of said term.

The invention claimed is:

1. A pseudorandom string generator comprising:
an electronic circuit that generates a pseudorandom string of terms belonging to a finite body K intended to be used in a cryptography procedure, said generator including circuitry for iteratively calculating a system of m polynomials with n variables belonging to a finite body K, wherein the coefficients of said m polynomials are deterministically regenerated on each iteration without using a stored coefficient from a previous iteration based on an original seed that is shorter than the coefficients of said m polynomials.

2. A pseudorandom string generator according to claim 1, wherein each of said polynomials forming the system is at most of second degree.

3. A pseudorandom string generator according to claim 1, further including a coefficient generator module in the form of a linear shift register.

4. A pseudorandom string generator according to claim 1, further including a coefficient generator module in the form of a non-linear shift register.

5. A pseudorandom string generator according to claim 1, further including a coefficient generator module in the form of a finite state machine.

6. A pseudorandom string generator comprising:
an electronic circuit that generates a pseudorandom string of terms belonging to a finite body K intended to be used in a cryptography procedure, said generator including circuitry for iteratively calculating a system of m polynomials with n variables belonging to a finite body K, based on an original seed that is shorter than the coefficients of said m polynomials for each iteration;
wherein,
to calculate an m-tuple of values taken, for a given n-tuple of variables, by the m polynomials of a system in which the polynomials are all of global degree less than or equal to D,
the generator includes circuitry for:
choosing a processing order for a given set of terms of a general polynomial with n variables of degree D;
for the processed terms, calculating, in the same order, a mononomial for the variables and then, successively for the m polynomials, generating the coefficient of that term and multiplying that coefficient by said mononomial to obtain the value of said term.

7. A pseudorandom string generator according to claim 1, wherein the electronic circuit comprises a hard-wired logic chip.

8. A method of generating a pseudorandom string of terms belonging to a finite body K of cardinal $q \geq 2$ intended to be used in a cryptography procedure, said method comprising:
iteratively calculating, using an electronic circuit, a system of m polynomials with n variables belonging to the finite body K; and
deterministically regenerating, from an initial state, using the electronic circuit, the coefficients of said m polynomials on each iteration without using a stored coefficient from a previous iteration based on an original seed that is shorter than the coefficients of said m polynomials.

9. A method according to claim 8 wherein each of said polynomials forming the system is at most of second degree.

10. A method of generating a pseudorandom string of terms belonging to a finite body K intended to be used in a cryptography procedure, said method comprising:
iteratively calculating, using an electronic circuit, a system of m polynomials with n variables belonging to the finite body K; and
regenerating, using the electronic circuit, the coefficients of said m polynomials on each iteration based on an original seed that is shorter than the coefficients of said m polynomials;
wherein, to calculate an m-tuple of values taken, for a given n-tuple of variables, by the m polynomials of a system in which the polynomials are all of global degree less than or equal to D, the method includes the following steps:
choosing a processing order for a given set of terms of a general polynomial with n variables of degree D;
for the processed terms, calculating, in the same order, a mononomial for the variables and then, successively for the m polynomials, generating the coefficient of that term and multiplying that coefficient by said mononomial to obtain the value of said term.

11. Non-transitory, non-removable data storage media including computer program code instructions for executing the steps of a method according to claim 8.

12. Non-transitory, partly or totally removable data storage media including computer program code instructions for executing the steps of a method according to claim 8.

13. A non-transitory data storage device having stored thereon a computer program containing instructions such that, when said program controls a programmable data processing device, said instructions cause said data processing device to execute a method according to claim 8.

14. An electronic circuit adapted to generate iteratively a sequence of elements from a finite field K, said elements being coefficients of terms in an expression of polynomials in a number of variables defined over K, thereby allowing an iterative computation of said polynomials from the number of variables, wherein each iteration deterministically regenerates the coefficients without using a stored coefficient from a previous iteration based on an original seed that is shorter than the coefficients of said polynomials.

* * * * *

UNITED STATES PATENT AND TRADEMARK OFFICE
CERTIFICATE OF CORRECTION

PATENT NO. : 8,416,951 B2  
APPLICATION NO. : 12/296687  
DATED : April 9, 2013  
INVENTOR(S) : Olivier Billet, Henri Gilbert and Côme Berbain Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 536 days.

Signed and Sealed this  
Thirty-first Day of December, 2013

Margaret A. Focarino  
*Commissioner for Patents of the United States Patent and Trademark Office*